Nov. 19, 1935.                J. M. MILLER                 2,021,321

RADIO RECEIVING SYSTEM

Filed Jan. 16, 1930

Inventor

John M. Miller

By Cornelius D. Ehret his Attorney

Patented Nov. 19, 1935

2,021,321

UNITED STATES PATENT OFFICE 2,021,321

RADIO RECEIVING SYSTEM

John M. Miller, Philadelphia, Pa., assignor to Atwater Kent Manufacturing Company, Philadelphia, Pa., a corporation of Pennsylvania Application January 16, 1930, Serial No. 421,097

2 Claims. (Cl. 250—27)

My invention relates to radio receiving systems and particularly to the detection or rectification of modulated radio-frequency energy.

In accordance with my invention, to overcome slumping of the radio-input audio-output characteristic of a thermionic detector, the input signal energy is utilized automatically to bias the grid of the tube increasingly negative as the radio-frequency input increases; more particularly, there is included in the detector input circuit a network, specifically a combination of resistance and capacity, whose time constant is greater than the period of the lowest frequency in the detector output, from which is derived the grid biasing potential.

In accordance with my invention, a portion of the input radio-frequency energy, especially when of high amplitude, is rectified and utilized for steady or direct negative grid bias purposes, and if the received energy be modulated, the rectification occurring in the plate circuit of the detector produces a plate current component corresponding with the modulation of the received energy.

Figure 1:
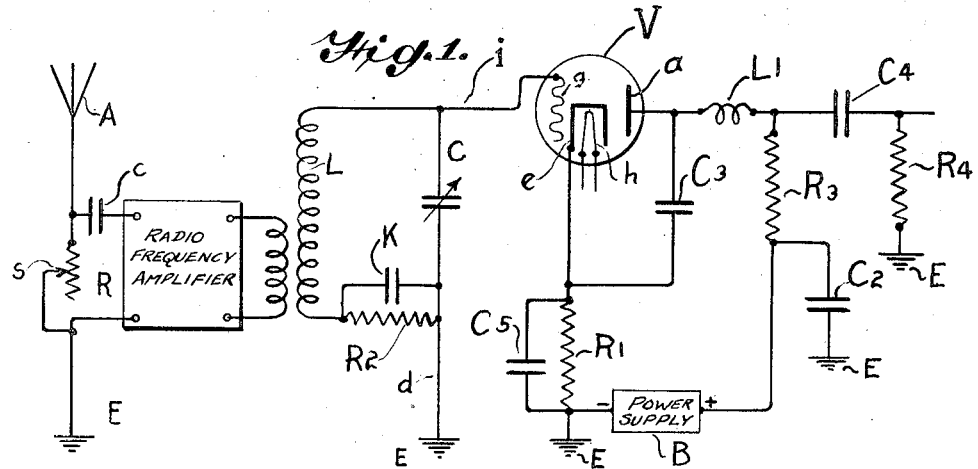

For an understanding of my invention and for an illustration of some of the various forms my apparatus may take, reference is to be made to the accompanying drawing in which:

Fig. 1 represents diagrammatically radio receiving apparatus utilizing my invention.

Figure 2:
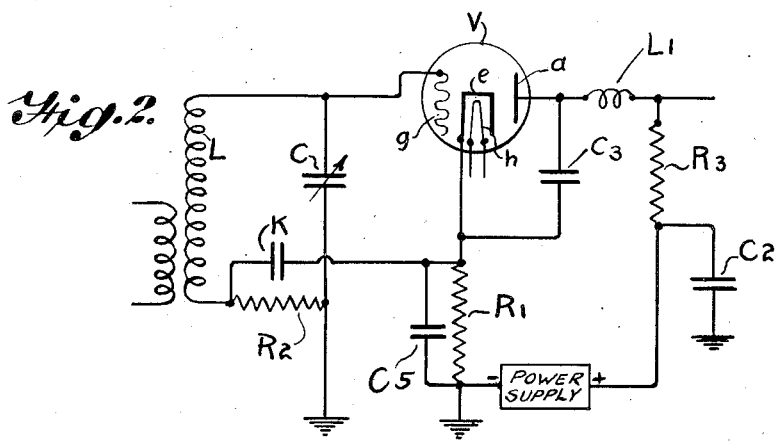

Fig. 2 discloses a detector circuit using a modified form of my invention.

Figure 3:
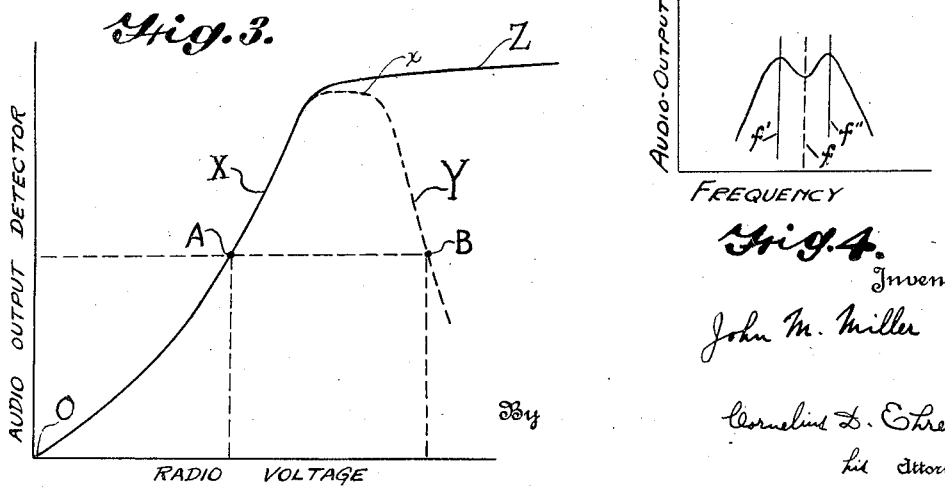
Figure 4:
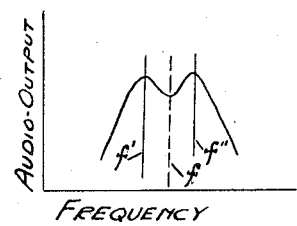

Figs. 3 and 4 are explanatory curves.

Referring to Fig. 1, radio-frequency energy received by the antenna A, is impressed upon the input circuit L, C of the detector tube V, which is a power detector or one utilizing anode circuit rectification. As indicated, there may intervene between the input circuit of the detector and the antenna, a radio-frequency amplifier of one or more stages whose input circuit is connected to the antenna through a small condenser $c$ and to earth E or equivalent counter capacity. Adjustment of the slider $s$ along the resistance R connected in the antenna path controls the amplitude of energy impressed upon the detector tube and, therefore, the amplitude or volume of signal reproduced by apparatus, as a loud-speaker, associated with the output system of the detector. The advantages of using the condenser $c$ and resistance R in this relation is no part of the present invention. In so far as this invention is concerned, the volume of reproduced signals may be varied in any known way of controlling the amplitude of the signal energy supplied to the detector input circuit.

The positive terminal of the power supply B, which may be a battery or a rectifier, which may have a voltage of 180 volts more or less, is connected to the anode $a$ of the tube and the negative terminal is connected through the resistance R1 to the cathode $e$ of the tube. The plate potential is about 40 or 50 volts above cathode potential. The grid $g$ of the tube is conductively connected through the inductance L of the input circuit to the negative terminal of the B battery, which, as indicated may be grounded. The grid of the tube is at a potential always lower than that of or is negative with respect to the cathode by virtue of the voltage across resistance R1 due to flow of anode current. The negative biasing of the grid may, however, be obtained in any other known ways.

In the operation of radio receiving apparatus using anode circuit rectification, as in power detectors, it has been found that, as shown graphically in Fig. 3, the audio output increases with increase of received signal energy, as from O along the curve X to a region such as $x$, and then when the radio voltage impressed upon the detector input circuit further increases, the audio output decreases, as indicated by the dotted portion Y of the curve. It may occur, for example, that when the system is receiving a signal of moderate intensity, represented for example by the abscissa of the point A, and then there is received a different but much more powerful signal whose strength is represented for example by the abscissa of the point B, the amplitude or volume of the reproduced signals, as effected by a loud speaker or the like, is the same for both the weaker and stronger signals. Or assuming a certain amplitude of received signal energy, and a certain setting of a volume control, such for example, as the contact $s$ on resistance R, the audio output may have a magnitude corresponding with the ordinate of the point A, or the audio output may correspond with the ordinate of the point B, as when the contact $s$ be moved to some other position corresponding with materially greater signal voltage impressed upon the detector input.

A disadvantage of this characteristic of detectors of the type referred to, is that the quality of reproduction corresponding with the stronger signals, for which the audio output has the magnitude indicated by the portion Y of the curve, is poor, or at least inferior to that corresponding with operation upon the portion X of the characteristic curve.

In accordance with my invention, by suitably controlling the grid bias of the detector tube, the radio-input audio-output characteristic curve of Fig. 3 is modified to comprise the portion X, as before, with the portion Z, for all points on which, at least within the vicinity of the upper end of the portion of the curve X and materially beyond, the audio output does not decrease, though it does not as rapidly increase, with increase in radio-input as upon the portion X; and accordingly the situation does not arise, as before explained, that for different magnitudes of radio-input there may be the same magnitudes of audio-output.

Furthermore, slumping of the radio-input audio-output characteristic beyond the region $x$ also gives rise to the phenomena of an apparent double-peaked resonance curve. As illustrated by Fig. 4, when the input circuit is tuned to a frequency $f$ and the signal energy is of such strength that due to resonance the radio frequency potential impressed upon the input circuit of the detector is at its maximum and corresponds to a point on the portion Y of the characteristic, the audio output of the detector, and, therefore, the volume of reproduction, is substantially less than that of signals, to which the set has not been tuned, but which give to radio frequency voltages in the input circuit which correspond with points upon the portion X of the characteristic curve.

Inasmuch as the operator in tuning a set makes an adjustment which effects maximum amplitude of reproduction, he would not, as indicated, by Fig. 4, tune to the frequency $f$ of the desired signal, for he would not know when his adjustment corresponded with resonance with the frequency $f$, since the audio output or amplitude of reproduction is at maximum for some other frequency, such as $f'$ or $f''$, either higher or lower than the frequency $f$. In seeking maximum response, the operator, therefore, has unconsciously detuned his set away from frequency $f$, with the result, as regards the desired signal, he has impaired quality, and increased the likelihood of interference from other stations.

In accordance with my invention, the automatic control of the grid bias of the detector tube which prevents the falling off of audio output when the radio input voltages are high and modifies the characteristic curve to comprise the portion Z insures maximum amplitude of reproduction for resonance at the frequency of the desired signal.

Referring to Fig. 1, there is included in the input circuit of the detector tube V a resistance R2 of suitably high magnitude which is shunted by a condenser K of low reactance to currents of radio frequency. The time constant of the network, comprising the resistance R2 and condenser K, is greater than the time period of the lowest frequency of modulation of the impressed signal energy, or in any event greater than the lowest frequency which is reproduced, as by a loud speaker associated with the detector output circuit. An equivalent would be a leaky condenser. By way of example only, resistor R2 may have a value of the order of ½ megohm and the condenser K a capacity of .1 microfarad.

Due to the asymmetrical conductivity between the grid $g$ and the cathode, when for strong radio input voltages the grid is positive for a small fraction of a cycle, there is produced from the input signal energy in the input circuit a small uni-directional current component or uni-directional current impulses which by virtue of the condenser K and its related resistance R2 is a substantially direct or continuous current, effecting, between the terminals of the resistance R2, a potential difference which negatively biases the grid $g$. The negative bias so imposed upon the grid $g$ has the effect that the characteristic curve of Fig. 3 is converted from the combination of X, $x$, Y to X, Z, with the result, previously indicated, that for very strong incoming signals, or for suitable manipulation of a volume control, the audio output does not slump or decrease; and with the further result that maximum audio output occurs at resonance, if the input system be tunable to the received signal energy.

When additional means are utilized for negatively biasing the grid, as the resistance R1 or any equivalent means, the negative bias upon the grid $g$ is the sum of the biases effected by resistance R1 or equivalent and the resistance R2 with condenser K.

Whether or not the additional grid biasing means, such as resistance R1, are utilized, the relations are such that for radio-frequency signal energy of high amplitude, the negative grid bias is always sufficient to prevent the detector operating upon that portion of the grid-voltage plate-current characteristic which corresponds to a decreasing ratio of plate current to grid voltage, which latter, if obtaining, yields the portion Y of the characteristic curve of Fig. 3.

The direct or continuous grid current due to received signal energy and traversing resistance R2 is always of such small magnitude that the selectivity of the tunable circuit L, C is not appreciably impaired. This automatic negative grid bias remains substantially constant for any given signal strength, and does not vary in magnitude with the modulation, since the time constant of the biasing network R2, K is greater than the perod of the lowest frequency of modulation. For the values of R2 and K given above the time constant (which is dependent upon the product of the resistance of R2 and the capacity of K) is .05 second, which corresponds to the period of a current of a frequency of 20 cycles per second, and is therefore greater than the period of the lowest frequency usually sought to be preserved in reproduction of sound.

The normal bias of grid $g$, in the example given, may be about 8 volts, the drop across resistance R1, but upon reception of a strong signal the bias is automatically increased by resistance R2 and condenser K, for example, to as high as 60 volts.

The negative grid bias effected by the received signal energy itself, does not instantly disappear upon cessation of that energy, but decreases to a certain fraction of its former magnitude within a certain time, which is the period or time constant of the network K, R2, whatever may have been the amplitude of the received energy. If, therefore, the time constant of the network K, R2 were made too great, as for example, of the order of several seconds, the receiving set would be for such length of time out of condition to receive weak signals to which, within such period, the operator might seek to tune the receiving system. Hence from the standpoint of speed of use of the set in the hands of the operator, it is desirable that the aforesaid time constant be not too great, and, on the other hand, it is desirable that it be not too short, that is, it should not be shorter than the period of the lowest frequency of modulation of the radio frequency energy received. Otherwise, there would occur variation of the negative grid bias, due to and effected by the received energy itself, because of the modulation of the received energy.

It is characteristic of my system that a portion of the input radio frequency energy, especially when of high amplitude, is rectified and utilized for steady or direct negative grid bias purposes; and if the received energy be modulated, the rectification occurring in the plate circuit of the detector produces a plate current component corresponding with the modulation of the received energy.

Although the resistance R2 is within the tunable loop L, C of the detector input circuit, it has negligible damping effect because shunted by the condenser K which, as before stated, offers low impedance to radio frequency currents. The resistance R2 is not necessarily within the loop, however, nor is the existence of a tunable loop circuit essential to my invention in its broader aspects. The condenser-resistance combination R2, K, may be anywhere in the input circuit between the grid and cathode. For example, it may be in the connection $d$ to ground, or in the connection $i$ from the inductance L to the grid of the tube. The indicated position is, however, preferred as it permits the rotor of the condenser C to be connected to ground, and also avoids the existence of capacity from the resistance to ground in shunt to the tuning condenser C.

The output circuit of the detector may be coupled to the input circuit of an amplifier system in any known manner; by a transformer, an impedance, or, as indicated, by resistance. The plate $a$ of the detector tube is connected to the upper terminal of the coupling resistance R3 of suitably high magnitude whose lower terminal is connected to the positive terminal of the power supply, the condenser C2 affording a path to earth of low impedance to currents of audio frequency. Preferably radio-frequency currents are excluded from the coupling resistance R3 by a filter network comprising the radio-frequency choke L1 and the radio-frequency by-pass condenser C3 connected between the anode $a$ and cathode $e$. The high potential end of the coupling resistance R3 is connected in the usual manner through the blocking condenser C4 to a subsequent input circuit, as of a tube between whose input electrodes is connected the grid-leak resistance R4.

The particular tube shown is of the uni-potential cathode type such as a UX227 whose cathode $e$ is raised to a temperature at which electrons are emitted by a heater $h$ connected to a suitable source of current, for example a battery or the low potential secondary of a power transformer. However, it will be understood that there may be used other types of tubes, including those whose cathodes are themselves traversed by heating current, either direct or alternating.

By way of example, the biasing resistance R1 may be 40,000 ohms and the audio by-pass condenser C6, which shunts it, may be of the order of 2 microfarads.

In the modification of my invention shown in Fig. 2, the audio-frequency by-pass condenser C5 may be greatly reduced in magnitude; for example, the condenser C5 of Fig. 2, when having a capacity of .1 microfarad, is equal in effectiveness to a condenser of 2 microfarads when the condenser K is connected as shown in Fig. 1. The significant change in Fig. 2, is the connection of one terminal of condenser K to the cathode $e$ instead of to ground as in Fig. 1. In this modification, the condenser K and resistance R2 not only supply an automatically varying biasing potential to the grid $g$ as before, but additionally function as a filter to prevent the grid from varying at audio frequency potential because of the inclusion of the resistance R1 in both the audio-output and radio-input circuits of the tube, and so permit great reduction in size of condenser C5. In this modification, although the resistance R2 is included in the tuned loop L, C, its damping effect is essentially negligible since the condensers K and C5 in series afford a path of low impedance to radio frequency in shunt to it. In this modification also, the condenser rotor is at ground potential.

What I claim is:

1. Radio receiving apparatus having a detector tube operating to effect rectified anode circuit current, a radio-frequency input circuit therefor comprising fixed inductance and variable capacity forming a tunable loop, and means for biasing the grid of said tube comprising a resistance within said tunable loop and a condenser of low impedance to radio-frequency currents in shunt to said resistance, said resistance and condenser jointly having a time constant greater than the period of the lowest frequency of said rectified current.

2. Radio receiving apparatus having a detector tube, a radio-frequency input circuit therefor comprising fixed inductance and variable capacity forming a tunable loop, means for biasing the grid of said tube to effect rectified anode circuit current comprising a resistance traversed by anode current included in said input circuit and external to said tunable loop, and means further biasing the grid of said tube comprising a second resistance, within said tunable loop and in series with said first resistance, and capacity of low impedance to radio-frequency currents in a path in shunt to a path including said second resistance.

JOHN M. MILLER.